(12) United States Patent
Rajne et al.

(10) Patent No.: US 7,852,646 B2
(45) Date of Patent: Dec. 14, 2010

(54) INSTANTANEOUS LOAD CURRENT CONTROL SCHEME FOR VOLTAGE FED DC TO AC INVERTER SUPPLYING RESISTIVE-INDUCTIVE LOAD

(75) Inventors: Milan Rajne, Bangalore (IN); Sukumar De, Bangalore (IN); Ram Krishan Maheshwari, Allahabad (IN)

(73) Assignee: Honeywell International Inc., Morristown, NJ (US)

( * ) Notice: Subject to any disclaimer, the term of this patent is extended or adjusted under 35 U.S.C. 154(b) by 431 days.

(21) Appl. No.: 11/969,308

(22) Filed: Jan. 4, 2008

(65) Prior Publication Data
US 2009/0175061 A1 Jul. 9, 2009

(51) Int. Cl.
*H02M 7/48* (2007.01)
(52) U.S. Cl. .......................... 363/95; 363/97
(58) Field of Classification Search .................. 363/41, 363/95, 97, 98
See application file for complete search history.

(56) References Cited

U.S. PATENT DOCUMENTS

| | | | |
|---|---|---|---|
| 5,343,139 A | 8/1994 | Gyugyi et al. | |
| 5,351,178 A | 9/1994 | Brennan et al. | |
| 5,594,322 A | 1/1997 | Rozman et al. | |
| 5,815,380 A * | 9/1998 | Cuk et al. | 363/16 |
| 6,166,929 A * | 12/2000 | Ma et al. | 363/37 |
| 7,075,264 B2 | 7/2006 | Huggett et al. | |
| 7,453,241 B2 * | 11/2008 | Keiter et al. | 322/28 |
| 7,602,627 B2 * | 10/2009 | Ohshima et al. | 363/97 |
| 7,688,608 B2 * | 3/2010 | Oettinger et al. | 363/132 |
| 2003/0085691 A1 | 5/2003 | Yao et al. | |
| 2005/0270814 A1 * | 12/2005 | Oh | 363/98 |
| 2009/0175061 A1 * | 7/2009 | Rajne et al. | 363/90 |
| 2009/0310390 A1 * | 12/2009 | Ohshima et al. | 363/71 |

OTHER PUBLICATIONS

"A High Frequency !GBT PWM Rectifier/Inverter System for AC Motor Drives Operating from Single Phase Supply", K. Thiyagarajah et al., IEEE Transactions of Power Electronics vol. 6, No. 4 Oct. 1991, pp. 576-584.

* cited by examiner

*Primary Examiner*—Jeffrey L Sterrett
(74) *Attorney, Agent, or Firm*—Oral Caglar, Esq.

(57) ABSTRACT

A control system is provided for controlling varying alternating current (AC) to a load with varying resistance and inductance. A plurality of nested control loops may employ cascaded proportional controllers to provide desired control of a pulse width modulation (PWM) block to control an inverter that supplies AC power to the load. An AC feedback signal may be supplied to each proportional controller. An AC signal may be added to outputs of the proportional controllers.

18 Claims, 5 Drawing Sheets

INSTANTANEOUS LOAD CURRENT CONTROL SCHEME FOR VOLTAGE FED DC TO AC INVERTER SUPPLYING RESISTIVE-INDUCTIVE LOAD

BACKGROUND OF THE INVENTION

The present invention is in the field of electrical power supply control and, more particularly, control of electrical power supply systems that provide power for loads with dynamically varying resistive and inductive characteristics.

Some power supply systems are constructed to provide alternating current (AC) with a controlled magnitude to loads which may be series combinations of resistance and inductance. One example of such a power supply requirement may arise when supplying current to exciter windings of a machine such as a starter-generator of an aircraft. AC power at a controlled frequency (e.g., 400 Hertz [Hz.]) may be supplied to the exciter windings to provide main generator excitation when the machine is in an engine-starting mode. As rotational speed of the machine varies, a corresponding change in excitation level is required. Thus, current supplied to the exciter winding must vary as a function of speed of the machine. This varying current must be accurately controlled during speed changes.

But, as speed changes, impedance (resistance and inductance) of the exciter winding changes. Consequently, a power supply system for such a machine must be capable of accurately controlling a dynamically changing current requirement in conditions of dynamically varying impedance.

Prior-art control systems have been employed to address this current control problem. In a typical prior-art system feedback signals may be generated by sensing the current in the exciter winding. A direct current (DC) representation of the sensed alternating current may be produced by rectification and filtering. The DC representation may be then provided to a proportional-integral controller for control of magnitude of alternating current that is delivered to the exciter winding. Large filters may be required for production of the DC feedback signal. Consequently, the transient performance of current control is poor. With use of DC feedback signal, information related to AC current waveform may be lost and a resultant alternating current to the exciter windings may be correspondingly distorted.

These distortions may lead to poor performance of the machine. Poor transient control and poor THD control may lead to current oscillations in the machine. The machine may then experience torque ripple and power loss.

As can be seen, there is a need to provide a power control system which may provide accurately controlled AC power with dynamically varying magnitude to a load with dynamically varying impedance. In particular, there is a need to provide such AC power with minimal THD and transient distortions.

SUMMARY OF THE INVENTION

In one aspect of the present invention an apparatus for control of alternating current comprises at least one proportional controller, a source of a feedback signal that is provided to the proportional controller and a source of a signal that is added to an output signal of the proportional controller. An alternating current source is responsive to at least one sum signal that is a sum of the signal and the output signal of the proportional controller.

In another aspect of the present invention an apparatus for controlling alternating current for a load with varying inductance and resistance comprises a plurality of nested control loops. At least one of the control loops comprises a proportional controller, a source of a feedback signal for the proportional controller and a source of a signal that is added to an output of the proportional controller to provide at least one desired control signal.

In still another aspect of the present invention a method for controlling alternating current provided to a load with varying resistance and inductance comprises the steps of performing at least one proportional control operation based on a feedback signal, adding a signal to an output of the step of performing at least one proportional control operation and performing control of current to the load responsively to a signal produced in the adding step.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in electrical power control systems which provide power to a dynamically varying load. More particularly, the present invention may provide such a control system for current supply to electrical loads with dynamically varying impedance. The present invention may be particularly useful in vehicles such as aircraft which may employ starter-generators. In such vehicles, a starter-generator may be provided field excitation with accurately controlled AC power. The present invention may provide accurate control of dynamically varying alternating current demands with minimal THD and transient distortions.

In contrast to prior-art power control systems, among other things, the present invention may perform control of alternating excitation current without employing a DC representation of the controlled current in a control scheme. The present invention, instead of a DC-based feedback system of control, may utilize an AC-based system that employs feedback and feed-forward signaling. Phase-shift analysis may be employed to provide one or more feed-forward control signals.

Figure 1:
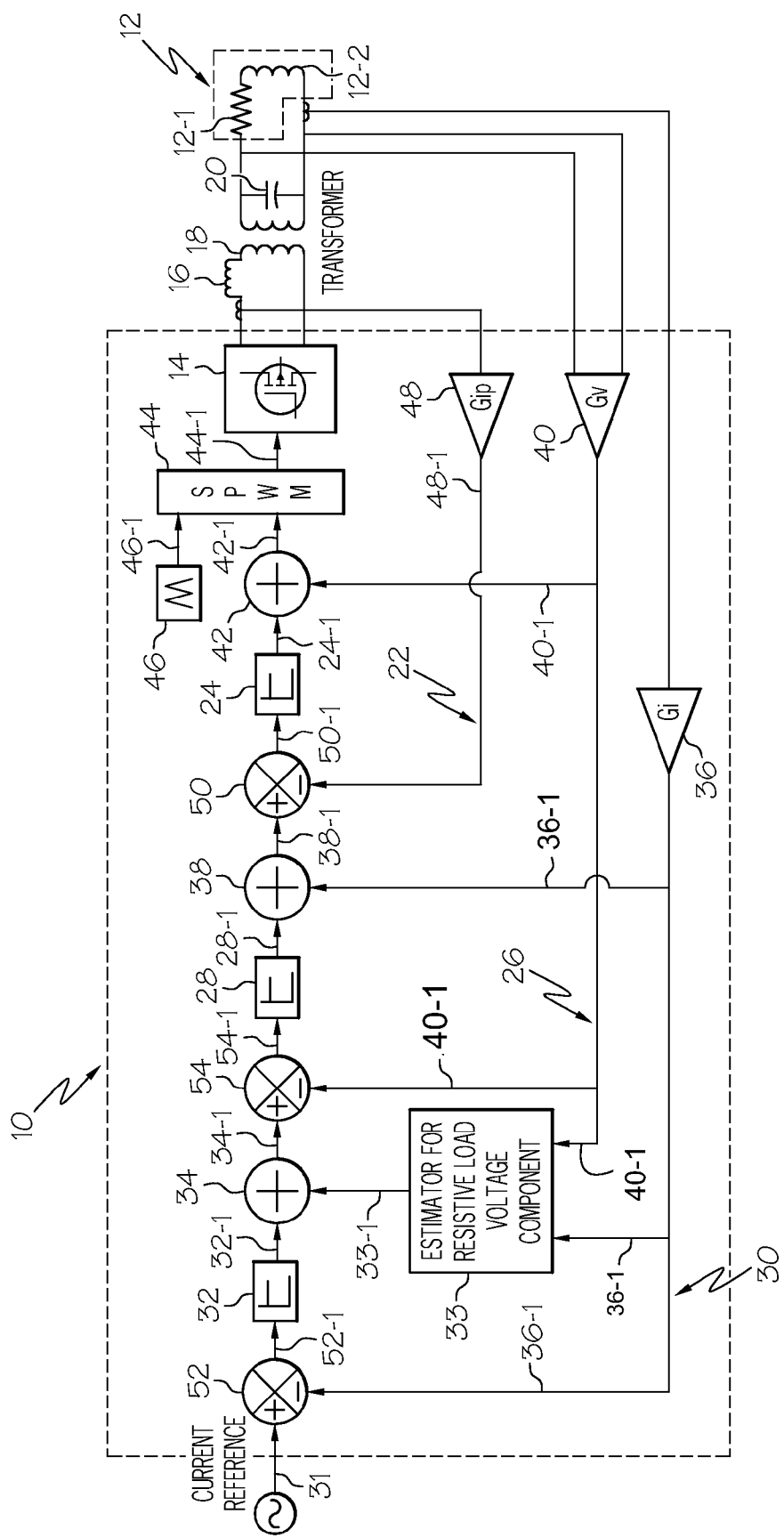
FIG. 1 is a block diagram of an embodiment of a current control system in accordance with the invention.

Referring now to FIG. 1, a block diagram illustrates a control apparatus 10 for supplying AC power to a load 12. The load 12 may comprise resistive elements, represented by 12-1 and inductive elements, represented by 12-2. The load 12 may vary dynamically. As the load 12 varies, a varying amount of current may be provided by the control apparatus 10. As the load 12 varies, its impedance represented by the resistive elements 12-1 and the inductive elements 12-2 may also vary.

The control apparatus 10 may supply distortion-free alternating current to the varying load 12.

In an illustrative embodiment of the present invention, a power source 14 such as an inverter may supply AC power to a single-phase resistive-inductive (R-L) load such as the load 12. Power may be supplied through a filter inductor 16, a transformer 18 and a filter capacitor 20. It may be noted that there may be numerous circuit configurations (not shown) through which power may transmitted from the inverter 14 to the load 12. For example, the inverter 14 may have a single-phase half-bridge or full bridge configuration. In the case of a three-phase load, the inverter 14 may have a three phase inverter bridge configuration. An inductive-capacitive (LC) filter may be placed before or after the transformer 18. The transformer 18 may be isolated or it may be an auto-transformer without isolation. Furthermore, it may be noted that the present invention may be performed with power sources other than inverters (e.g. a linear amplifier may be employed as the power source 14).

The control apparatus 10 may comprise a plurality of nested control loops. In an exemplary embodiment of the invention shown in FIG. 1, three control loops are shown. A first control loop 22 may comprise a transformer-primary current proportional controller 24. A second control loop 26 may comprises a load-voltage proportional controller 28. An outer control loop 30 may comprise a load-current proportional controller 32.

In operation, a current reference signal 31 may be provided to the control apparatus 10. An estimator 33 may produce a signal 33-1 that may be an estimate of a resistive component of load voltage (as described hereinbelow with respect to FIGS. 2 and 3). An output 32-1 of the load-current proportional controller 32 may be added to the estimated resistive load voltage signal 33-1 with a feed-forward summer 34 to produce a signal 34-1. The signal 34-1 may comprise a reference for the load-voltage proportional controller 28. The proportional controller 28 may produce a signal 28-1.

A load-current sensor 36 may provide a sensed load current signal 36-1 to a feed-forward summer 38. In that regard the sensor 36 may be considered a signal source. The signal 28-1 and 36-1 may be added to produce a signal 38-1. The signal 38-1 may comprise a reference for the transformer-primary current proportional controller 24. The proportional controller 24 may produce a signal 24-1.

A load voltage sensor 40 may provide a sensed load voltage signal 40-1 to a feed-forward summer 42. In that regard the sensor 40 may be considered a signal source. The signals 24-1 and 40-1 may be added to produce a signal 42-1. The signal 42-1 may provide a reference for a sinusoidal pulse-width-modulator (PWM) block 44. The signal 42-1 may then be compared with a signal 46-1 that may be generated by a fixed frequency triangular/sawtooth signal generator 46. The PWM block 44 may then generate a PWM signal 44-1 for the inverter 14.

The feed-forward signals described above may be added in such a way that resultant control signals cancel disturbance effect that may be produced by the filter inductor 16, the transformer 18, the filter capacitor 20 and/or the impedance load 12.

A transformer-primary current sensor 48 may provide a current feedback signal to a feedback summer 50. In that regard the sensor 48 may be considered a signal source. Similarly a feedback signal 36-1 may be provided to a feedback summer 52 and a signal 40-1 may be provided as a feedback signal to a feedback summer 54. Within the feedback summers 50, 52 and 54 reference signals may be added to feedback signals to produce modulated reference signal 50-1, 52-1 and 54-1, to provide negative feedback effect for the respective proportional controllers 24, 32 and 28. It may be noted that the feedback signals, unlike the prior-art, may be produced in AC format and used as control signals in AC format. In that regard, the control apparatus 10 may be considered to provide instantaneous load current control.

It may be noted that accuracy of the inventive control apparatus 10 may be dependent on an accurate determination of the feed-forward signals 33-1, 36-1 and 40-1. The voltage feed-forward signal 40-1 may be directly determined with the sensor 40. Similarly, the current feed-forward signal 36-1 may be directly determined with the sensor 36. However, the signal 33-1 may not be directly determined with conventional sensors such as the sensors 36 and 40. The signal 33-1 may represent a resistive component of load voltage. The signal 33-1 may be provided as an estimation signal that may be produced in a novel manner in accordance with the present invention as described hereinbelow with respect to FIGS. 2 and 3.

A desirable aspect of the embodiment of the invention shown in FIG. 1 is that a gain may be calculated for each of the control loops 22, 26 and 30, such that a time constant of these control loops successively increases from inner most loop (22) to outermost loop (30). The outer control loop 30 may be slower than the inner control loops 22 and 26.

Figure 2:
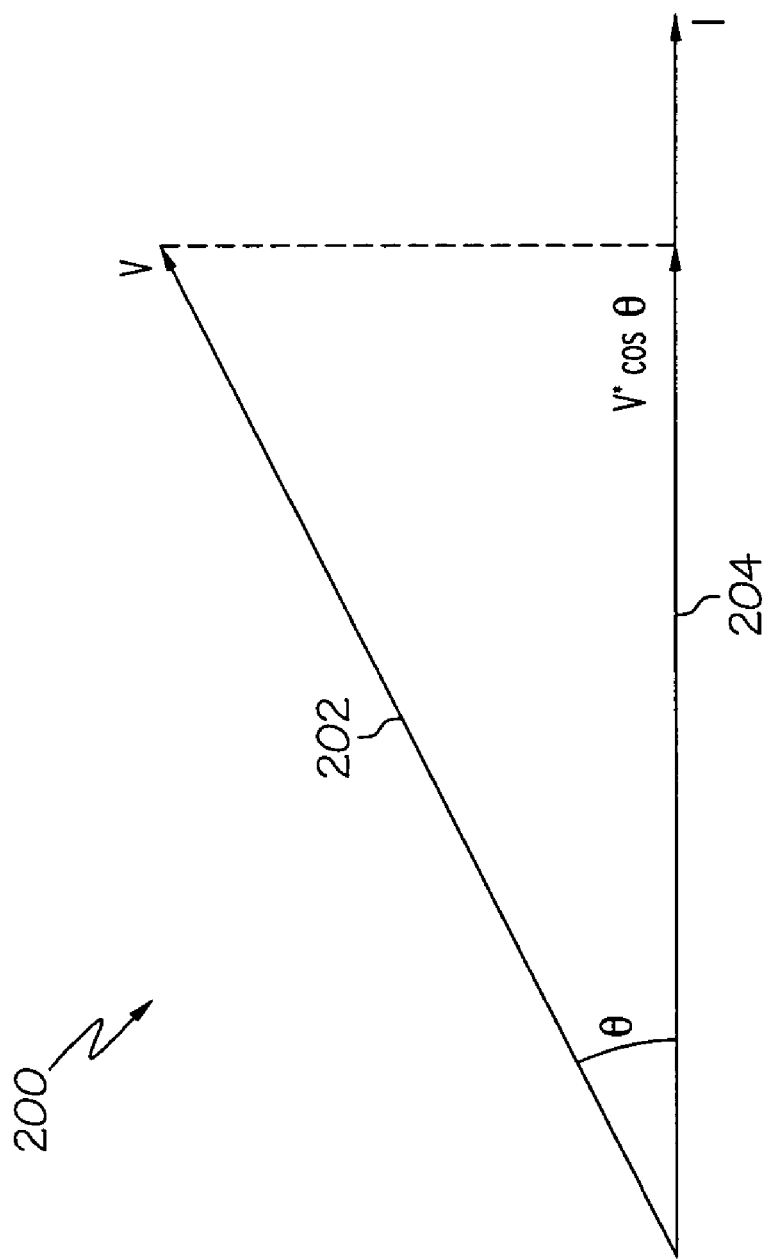
FIG. 2 is a vector diagram of a relationship of current and voltage in accordance with the invention.
Figure 3:
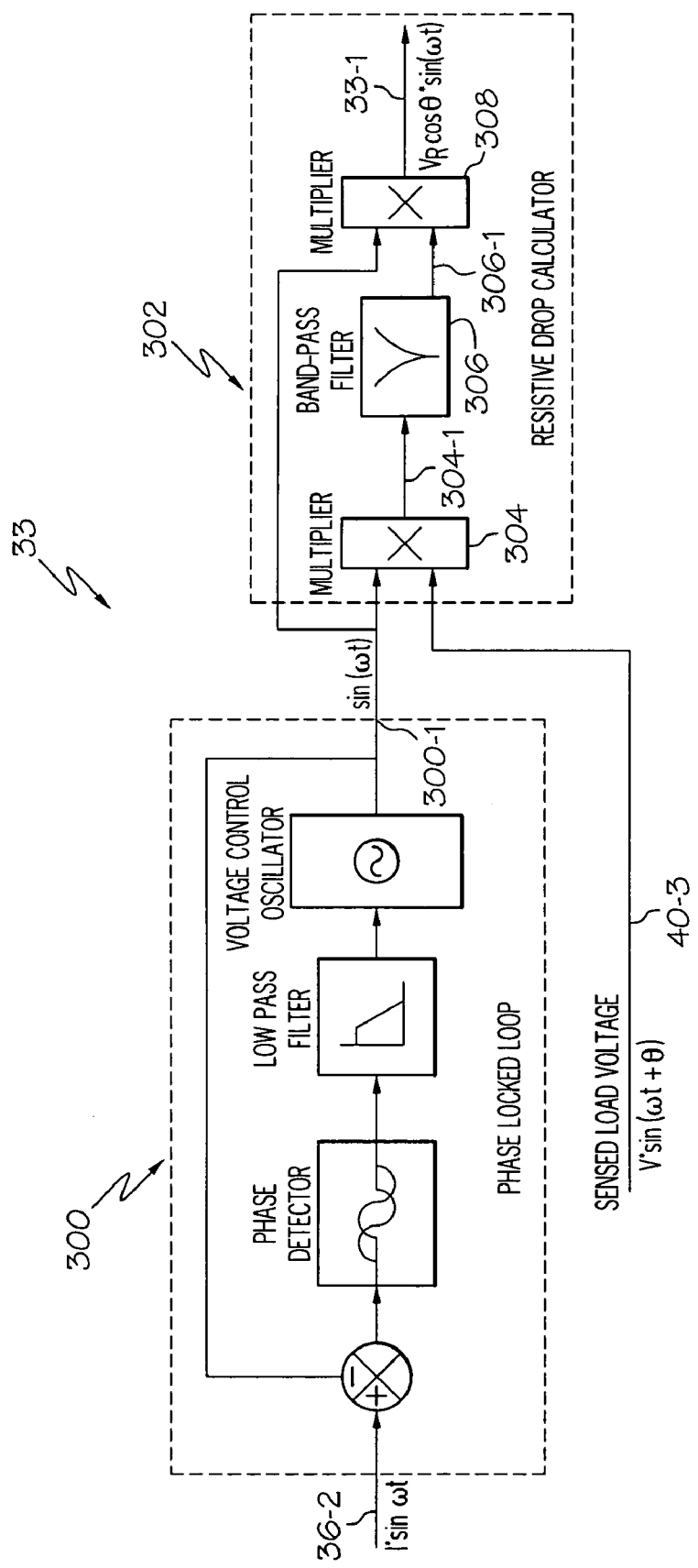
FIG. 3 is a block diagram of an estimator in accordance with the present invention.

Referring now to FIGS. 2 and 3 an inventive apparatus for providing the signal 33-1 may be understood. In FIG. 2 a vector diagram designated generally by the numeral 200, may illustrate a load output voltage vector 202 and a load current vector 204. In an exemplary embodiment shown in FIG. 2, load output voltage, represented by the vector 202 may lead load current, represented by the vector 204. An amount of lead may be represented by an angle θ.

A value of θ may be dependent on values of load resistance and inductance. A resistive component of load voltage ($V_R$) may be determined from a projection of the vector 202 onto the vector 204. It may be seen that $V_R$ may be determined in accordance with the expression:

$$V_R = V^* \cos \theta \qquad \text{(Equation 1)}$$

where:

$V_R$ is resistive component of load voltage;

V is load voltage; and

θ is an angle by which load voltage lead load current.

FIG. 3 is block diagram of an exemplary embodiment of the estimator 33 of FIG. 1. The estimator 33 may comprise a conventional phase-locked loop (PLL) 300 and a resistive drop calculator 302. In operation, the PLL 300 may generate a unity magnitude sine wave signal 300-1 in phase with a load current sensed signal 36-1. The signal 300-1 may be provided as an input to the resistive drop calculator 302. A multiplier 304 may multiply the signal 300-1 with a load voltage sensed signal 40-1. An output of the multiplier 304 may represent an instantaneous power signal 304-1 which may comprise a direct current (DC) average component and a pulsating component. The pulsating component may have a frequency that is twice the frequency of load voltage and/or load current. A band-pass filter 306 may be employed to remove the pulsating component from the signal 304-1. A resultant output from the filter 306 may represent a constant magnitude signal 306-1 that may represent the magnitude of $V_R$ as described in Equation 1 above.

The signal 306-1 may be multiplied with the signal 300-1 in a multiplier 308. An output of the multiplier 308 may represent the resistive component of load voltage. As such the output of the multiplier 308 may be utilized as the feed-forward signal 33-1 of FIG. 1.

It may be noted that inductive variations of load may not change low frequency gain of a closed loop system such as the apparatus 10 of FIG. 1. Change in inductance value of load may affect bandwidth and stability of the control apparatus 10. With a proper selection of proportional gain (Kp) of the outer loop 30, a dynamic variation of inductance control within the apparatus 10 may not be required.

In any closed-loop control system design it is desirable to utilize minimum bandwidth while maintaining stability of the system. It may be seen that Kp may be chosen to provide required system bandwidth for a maximum inductance that may be expected in the load. Thus any variation of inductance (i.e. a reduction) may result in a desirable increase of bandwidth. But at a minimum inductance and a maximum bandwidth of the outer loop 30, the control apparatus 10 may become unstable if bandwidth of the outer loop 30 exceeds bandwidth of the inner loops 22 and 26. Thus bandwidth of the inner control loops 22 and 26 may be selected to preclude this undesirable instability.

Figure 4:
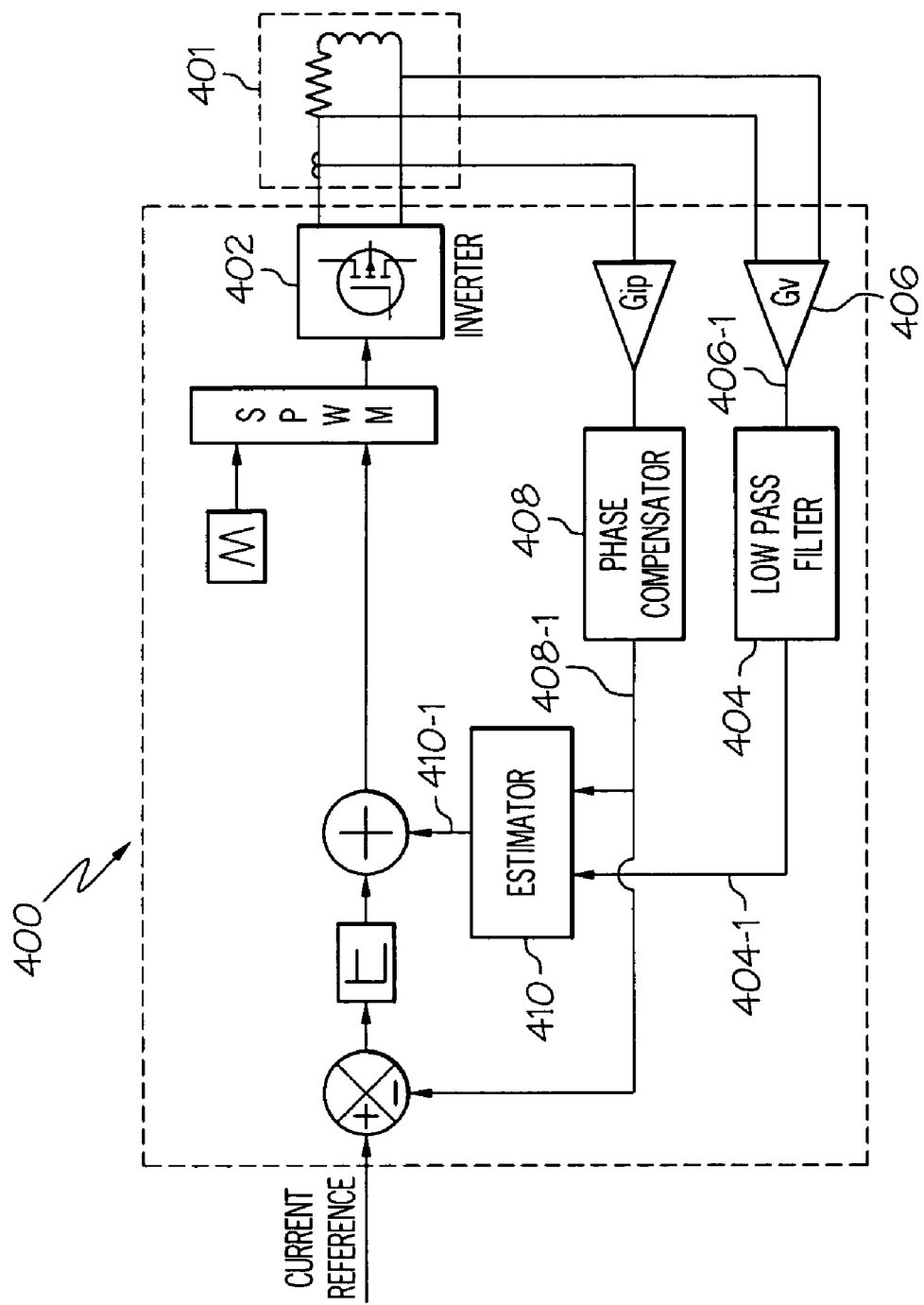
FIG. 4 is a block diagram of a another embodiment of a current control system in accordance with the invention.

Referring now to FIG. 4, it may be seen that the novel control principles of the present invention may be applied to a control apparatus 400 for control of a load 401 that may be directly driven by a DC-AC inverter 402. It may be noted that, in the configuration of FIG. 4, load voltage may not be purely sinusoidal. The load voltage may be a pulsed wave whose pulse width may be modulated as a sine wave. To extract a fundamental sine wave, a low pass filter 404 may be required. The low pass filter 404 may introduce phase shift in sensed voltage, (i.e. a sensed voltage signal 406-1 provided by a sensor 406). An amount of phase shift may be a function of bandwidth of the low-pass filter 404 and switching frequency of the inverter 402. Compensation for the phase shift may be provided with a phase compensator 408.

An estimator 410 may be provided with a signal 404-1 from the low-pass filter 404 and a signal 408-1 from the phase compensator 408. In the manner described above with respect to FIG. 3, the estimator 410 may provide a signal 410-1 that may represent a resistive component of load voltage. As to all other aspects of control operation, the apparatus 400 may operate in the manner described above with respect to the apparatus 10 of FIG. 1.

Figure 5:
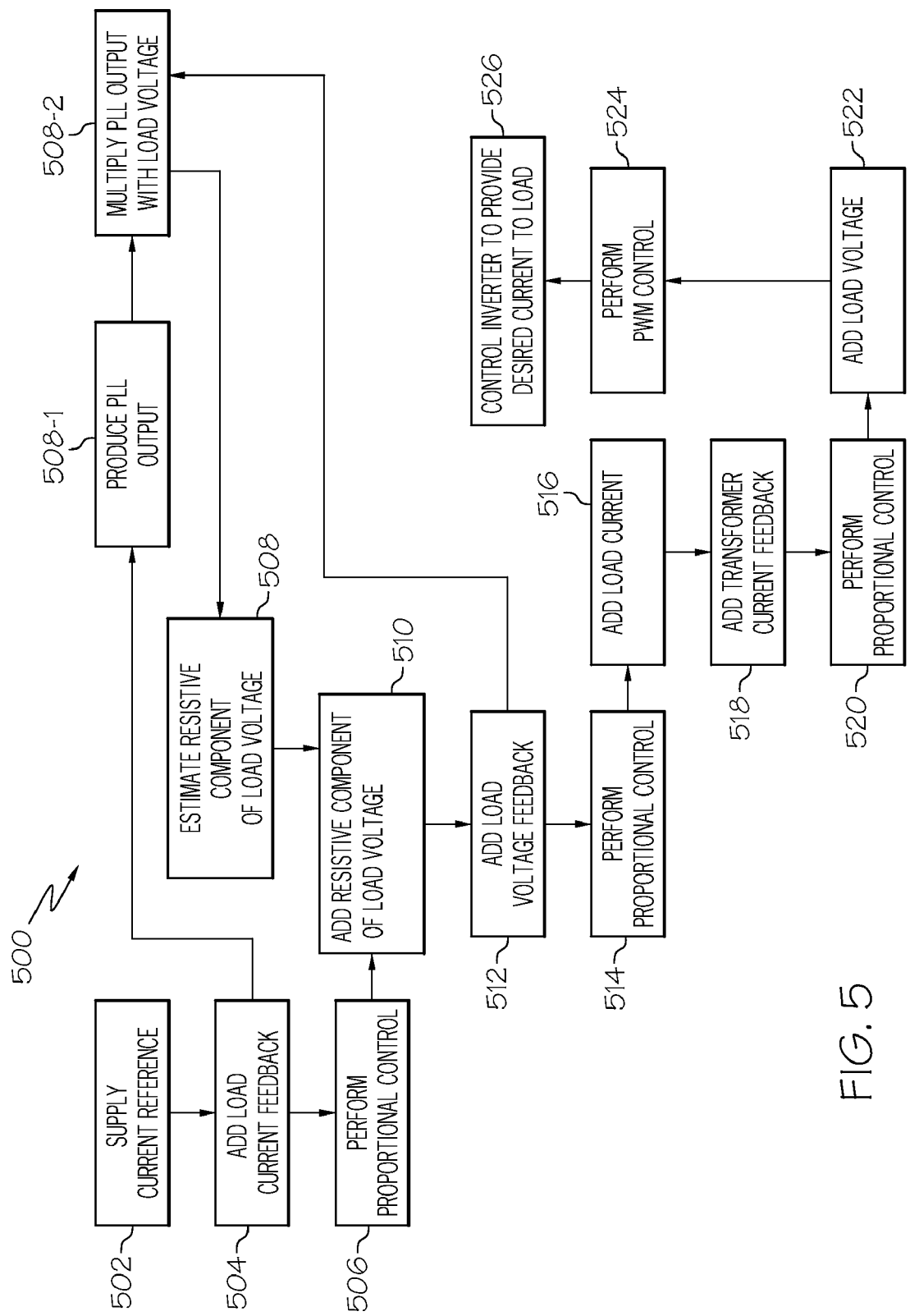
FIG. 5 is a flow chart of a method for controlling current in accordance with the present invention.

In one embodiment of the present invention, a method is provided for controlling a varying amount of alternating current to a load having varying resistive and inductive components. In that regard the method may be understood by referring to FIG. 5. In FIG. 5, a flow chart portrays various aspects of an inventive method 500. In a step 502, a reference current signal may be supplied (e.g. the signal 31 may be supplied to the control apparatus 10). In a step 504, a load current feedback signal may be added to the current reference (e.g. the signal 36-1 may be added to the signal 31 within the summer 52). In a step 506, proportional control may be performed (e.g. the proportional controller 32 may produce the signal 32-1).

In a step 508, an estimate of a resistive component of load voltage may be determined (e.g., the estimator 33 may provide a signal 33-1 based on signals 36-1 and 40-1). The step 508 may comprise a sub-step 508-1 in which a PLL output may be produced and a sub-step 508-2 in which the PLL output may be multiplied with sensed load voltage.

In a step 510, the resistive component determined in step 508 may be added to a signal produced in step 506 (e.g., the signal 33-1 may be added to the signal 32-1 with the summer 34). In a step 512, a load voltage feedback signal may be added to a signal produced in step 510 (e.g., the signal 40-1 may be added to the signal 34-1 with the summer 54). In a step 514, proportional control may be performed (e.g., the proportional controller 28 may produce the signal 28-1).

In a step 516, a load current signal may be added to a signal produced in step 514 (e.g., the signal 36-1 may be added to the signal 28-1 with the summer 38). In a step 518, a transformer current feedback signal may be added to a signal produced in step 516 (e.g., the signal 48-1 may be added to the signal 38-1 with the summer 50). In a step 520, proportional control may be performed (e.g., the proportional controller 24 may produce the signal 24-1). In a step 522, a load voltage signal may be added to a signal produced in step 520 (e.g., the signal 40-1 may be added to the signal 24-1 with the summer 42).

In a step 524, PWM control may be performed (e.g., the signal 42-1 may be compared with the signal 46-1 to produce a command signal 44-1 for the inverter 14). In a step 526, an inverter may be controlled to provide a desired current to a load (e.g., the inverter 14 may respond to command signals 44-1 from the PWM block 44 to produce a desired current to the load 12).

It may be noted that the steps of performing proportional control may be conducted in any sequence. In the above exemplary description of the method 500, the steps 506, 514 and 520 are described as being performed in succession. The method 500 may be successfully performed even if, for example, step 520 is performed prior to step 506. Also, the method 500 may be performed successfully if the steps 506, 514 and 520 are performed simultaneously. However, in the case of simultaneous performance of the steps 506, 514 and 520, the control apparatus 10 may have diminished responsiveness as compared to responsiveness that may be provided with sequential performance of the steps 506, 514 and 520.

It should be understood, of course, that the foregoing relates to exemplary embodiments of the invention and that modifications may be made without departing from the spirit and scope of the invention as set forth in the following claims.

We claim:

1. An apparatus for control of alternating current comprising:
   a first proportional controller;
   a source of a first feedback signal that is provided to the first proportional controller;
   a source of a load voltage signal that is added to an output signal of the first proportional controller;
   a source of alternating current responsive to a first sum signal that is a sum of the load voltage signal and the output signal of the first proportional controller;
   a second proportional controller adapted to receive the load voltage signal;
   a source of a load current signal that is added to an output signal of the second proportional controller; and
   the first proportional controller responsive to a second sum signal that is a sum of the load current signal and the output signal of the second proportional controller.

2. The apparatus of claim 1 further comprising:
   an estimator for determining a resistive component of load voltage and producing a corresponding signal;
   the estimator being responsive to load current feedback signals and load voltage feedback signals.

3. The apparatus of claim 2 wherein the estimator comprises:
   a phase locked loop (PLL); and
   a resistive drop calculator.

4. The apparatus of claim 1 wherein the source of alternating current comprises an inverter.

5. The apparatus of claim 4 further comprising:
   a pulse width modulation (PWM) block responsive to the first sum signal; and wherein the PWM block provides commands to the inverter.

6. The apparatus of claim 1 further comprising:
a third proportional controller adapted to receive the load current signal;
a source of a resistive-load-voltage-component signal that is added to an output signal of the third proportional controller; and
the second proportional controller responsive to a third sum signal that is a sum of the resistive-load-voltage-component signal and the output signal of the third proportional controller.

7. An apparatus for controlling alternating current for a load with varying inductance and resistance comprising:
a plurality of nested control loops;
at least one of the control loops comprising;
    a proportional controller;
    a source of a feedback signal for the proportional controller; and
    a source of a signal that is added to an output of the proportional controller to provide at least one desired control signal.

8. The apparatus of claim 7 further comprising:
an estimator for determining a resistive component of load voltage and producing a corresponding signal;
the estimator being responsive to load current feedback signals and load voltage feedback signals; and
the estimator comprising;
    a phase locked loop (PLL); and
    a resistive drop calculator.

9. The apparatus of claim 7 wherein the at least one desired control signal is employed to control an inverter.

10. The apparatus of claim 9 further comprising:
a PWM block;
the at least one desired control signal is employed to control the PWM block to produce control commands for the inverter.

11. The apparatus of claim 7 wherein at least one of the control loops provides a second desired control signal for another one of the control loops.

12. A method for controlling alternating current provided to a load with varying resistance and inductance comprising the steps of:
performing at least one proportional control operation based on a feedback signal;
adding a load voltage signal to an output of the step of performing at least one proportional control operation;
performing control of current to the load responsively to a signal produced in the adding step;
performing a second proportional control operation;
adding a load current signal to an output of the step of performing a second proportional control; and
performing the at least one proportional control operation step responsively to a signal produced in the step of adding the load current signal.

13. The method of claim 12 comprising the further steps of:
estimating a resistive component of a load voltage; and
adding a signal produced in the estimating step to an output signal of a proportional controller as a resistive-load-voltage-component signal.

14. The method of claim 13 wherein the step of estimating comprises the further steps of:
providing a sensed load current signal to a phase locked loop (PLL);
providing an output signal of the PLL to a resistive drop calculator;
providing a sensed load voltage signal to the resistive drop calculator; and
producing the resistive-load-voltage-component signal with the resistive drop calculator that is representative of a resistive component of load voltage.

15. The method of claim 14 wherein the step of producing the resistive-load-voltage-component signal comprises the further steps of:
multiplying the sensed load voltage signal with the output signal of the PLL to produce a first multiplied signal;
passing the first multiplied signal through a band pass filter to produce a filtered signal; and
multiplying the filtered signal with the output signal of the PLL to produce a second multiplied signal that is representative of the resistive component of load voltage.

16. The method of claim 12 comprising the further step of:
performing PWM control responsively to a signal produced in the adding step.

17. The method of claim 16 wherein the step of performing current control to the load is performed responsively to commands produced in the step of performing PWM control.

18. The method of claim 12 further comprising the steps of:
performing a third proportional control operation;
adding a resistive-load-voltage-component signal to an output of the step of performing a third proportional control operation;
performing at least one of the proportional control operation steps responsively to a signal produced in the step of adding the resistive-load-voltage-component signal.

* * * * *